United States Patent [19]

Hellman et al.

[11] 4,218,582

[45] Aug. 19, 1980

[54] PUBLIC KEY CRYPTOGRAPHIC APPARATUS AND METHOD

[75] Inventors: Martin E. Hellman, Stanford; Ralph C. Merkle, Palo Alto, both of Calif.

[73] Assignee: The Board of Trustees of the Leland Stanford Junior University, Stanford, Calif.

[21] Appl. No.: 839,939

[22] Filed: Oct. 6, 1977

[51] Int. Cl.$^2$ .............................................. H04L 9/04
[52] U.S. Cl. ...................................... 178/22; 364/900
[58] Field of Search ........................................ 178/22

[56] References Cited

PUBLICATIONS

"New Directions in Cryptography," Diffie et al., *IEEE Transactions on Information Theory*, vol. II22, No. 6, Nov. 1976, pp. 644–654.
"A User Authentication Scheme not Requiring Secrecy in the Computer," Evans, Jr., et al., *Communications of the ACM*, Aug. 1974, vol. 17, No. 8, pp. 437–442.
"A High Security Log-In Procedure," Purdy, *Communications of the ACM*, Aug. 1974, vol. 17, No. 8, pp. 442–445.
Diffie et al., "Multi-User Cryptographic Techniques," *AFIPS Conference Proceedings*, vol. 45, pp. 109–112, Jun. 8, 1976.

*Primary Examiner*—Howard A. Birmiel

[57] ABSTRACT

A cryptographic system transmits a computationally secure cryptogram that is generated from a publicly known transformation of the message sent by the transmitter; the cryptogram is again transformed by the authorized receiver using a secret reciprocal transformation to reproduce the message sent. The authorized receiver's transformation is known only by the authorized receiver and is used to generate the transmitter's transformation that is made publicly known. The publicly known transformation uses operations that are easily performed but extremely difficult to invert. It is infeasible for an unauthorized receiver to invert the publicly known transformation or duplicate the authorized receiver's secret transformation to obtain the message sent.

17 Claims, 13 Drawing Figures

PUBLIC KEY CRYPTOGRAPHIC APPARATUS AND METHOD

The Government has rights in this invention pursuant to Grant No. ENG-10173 of the National Science Foundation and IPA No. 0005.

BACKGROUND OF THE INVENTION

1. Field of Invention

The invention relates to cryptographic systems.

2. Description of Prior Art

Cryptographic systems are widely used to ensure the privacy and authenticity of messages communicated over insecure channels. A privacy system prevents the extraction of information by unauthorized parties from messages transmitted over an insecure channel, thus assuring the sender of a message that it is being read only by the intended receiver. An authentication system prevents the unauthorized injection of messages into an insecure channel, assuring the receiver of the message of the legitimacy of its sender.

Currently, most message authentication consists of appending an authenticator pattern, known only to the transmitter and intended receiver, to each message and encrypting the combination. This protects against an eavesdropper being able to forge new, properly authenticated messages unless he has also stolen the cipher key being used. However, there is little protection against the threat of dispute; that is, the transmitter may transmit a properly authenticated message, later deny this action, and falsely blame the receiver for taking unauthorized action. Or, conversely, the receiver may take unauthorized action, forge a message to itself, and falsely blame the transmitter for these actions. The threat of dispute arises out of the absence of a suitable receipt mechanism that could prove a particular message was sent to a receiver by a particular transmitter.

One of the principal difficulties with existing cryptographic systems is the need for the sender and receiver to exchange a cipher key over a secure channel to which the unauthorized party does not have access. The exchange of a cipher key frequently is done by sending the key in advance over a secure channel such as private courier or registered mail; such secure channels are usually slow and expensive.

Diffie, et al, in "Multiuser Cryptographic Techniques," *AFIPS-Conference Proceedings*, Vol. 45, pp. 109-112, June 8, 1976, propose the concept of a public key cryptosystem that would eliminate the need for a secure channel by making the sender's keying information public. It is also proposed how such a public key cryptosystem could allow an authentication system which generates an unforgeable message dependent digital signature. Diffie presents the idea of using a pair of keys E and D, for enciphering and deciphering a message, such that E is public information while D is kept secret by the intended receiver. Further, although D is determined by E, it is infeasible to compute D from E. Diffie suggests the plausibility of designing such a public key cryptosystem that would allow a user to encipher a message and send it to the intended receiver, but only the intended receiver could decipher it. While suggesting the plausibility of designing such systems, Diffie presents neither proof that public key cryptosystems exist, nor a demonstration system.

Diffie suggests three plausibility arguments for the existence of a public key cryptosystem: a matrix approach, a machine language approach and a logic mapping approach. While the matrix approach can be designed with matrices that require a demonstrably infeasible cryptanalytic time (i.e., computing D from E) using known methods, the matrix approach exhibits a lack of practical utility because of the enormous dimensions of the required matrices. The machine language approach and logic mapping approach are also suggested, but there is no way shown to design them in such a manner that they would require demonstrably infeasible cryptanalytic time.

Diffie also introduces a procedure using the proposed public key cryptosystems, that could allow the receiver to easily verify the authenticity of a message, but which prevents him from generating apparently authenticated messages. Diffie describes a protocol to be followed to obtain authentication with the proposed public key cryptosystem. However, the authentication procedure relies on the existence of a public key cryptosystem which Diffie did not provide.

SUMMARY AND OBJECTS OF THE INVENTION

Accordingly, it is an object of the invention to allow authorized parties to a conversation (conversers) to converse privately even though an unauthorized party (eavesdropper) intercepts all of their communications.

Another object of this invention is to allow a converser on an insecure channel to authenticate another converser's identity.

Another object of this invention is to provide a receipt to a receiver on an insecure channel to prove that a particular message was sent to the receiver by a particular transmitter. The object being to allow the receiver to easily verify the authenticity of a message, but to prevent the receiver from generating apparently authenticated messages.

An illustrated embodiment of the present invention describes a method and apparatus for communicating securely over an insecure channel, by communicating a computationally secure cryptogram that is a publicly known transformation of the message sent by the transmitter. The illustrated embodiment differs from prior approaches to a public key cryptosystem, as described in "Multiuser Cryptographic Techniques," in that it is both practical to implement and is demonstrably infeasible to invert using known methods.

In the present invention, a receiver generates a secret deciphering key and a public enciphering key, such that the secret deciphering key is difficult to generate from the public enciphering key. The transmitter enciphers a message to be communicated by transforming the message with the public enciphering key, wherein the transformation used to encipher the message is easy to effect but difficult to invert without the secret deciphering key. The enciphered message is then communicated from the transmitter to the receiver. The receiver deciphers the enciphered message by inverting the enciphering transformation with the secret deciphering key.

Another illustrated embodiment of the present invention describes a method and apparatus for allowing a transmitter to authenticate an authorized receiver's identity. The authorized receiver generates a secret deciphering key and a public enciphering key, such that the secret deciphering key is difficult to generate from the public enciphering key. The transmitter enciphers a message to be communicated by transforming the message with the public enciphering key, wherein the transformation used to encipher the message is easy to effect but difficult to invert without the secret deciphering key. The enciphered message is then transmitted from the transmitter to the receiver. The receiver deciphers the enciphered message by inverting the enciphering transformation with the secret deciphering key. The receiver's identity is authenticated to the transmitter by the receiver's ability to decipher the enciphered message.

Another illustrated embodiment of the present invention describes a method and apparatus for providing a receipt for a communicated message. A transmitter generates a secret key and a public key, such that the secret key is difficult to generate from the public key. The transmitter then generates a receipt by transforming a representation of the communicated message with the secret key, wherein the transformation used to generate the receipt is difficult to effect without the secret key and easy to invert with the public key. The receipt is then communicated from the transmitter to the receiver. The receiver inverts the transformation with the public key to obtain the representation of the communicated message from the receipt and validates the receipt by comparing the similarity of the representation of the communicated message with the communicated message.

Additional objects and features of the present invention will appear from the description that follows wherein the preferred embodiments have been set forth in detail in conjunction with the accompanying drawings.

Figure 11:
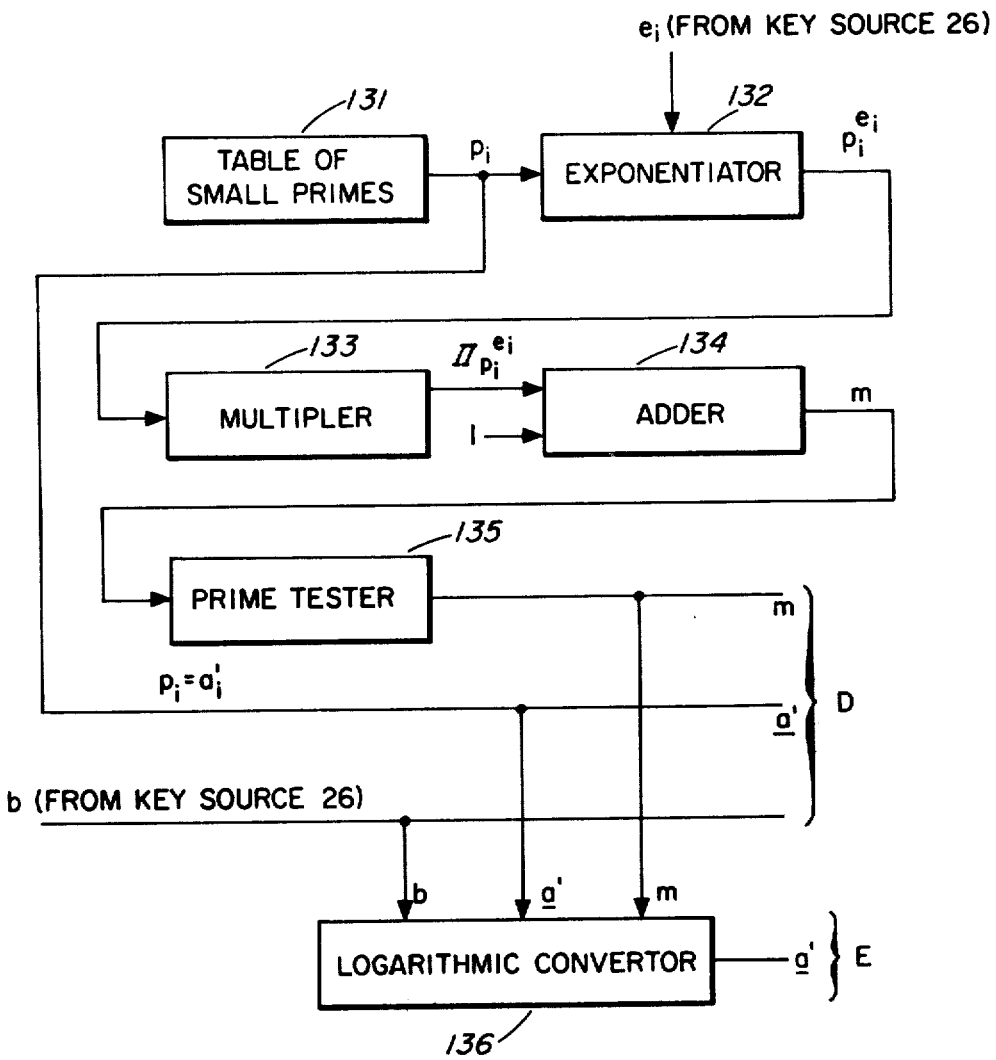
FIG. 11 is a public key generator for generating the public enciphering key in the public key cryptosystem of FIG. 1.

where $0 \leq b_j \leq p_i - 1$, of the logarithmic convertor of FIG. 11, when $p-1$ is not a power of 2.

DESCRIPTION OF THE PREFERRED EMBODIMENT

Figure 1:
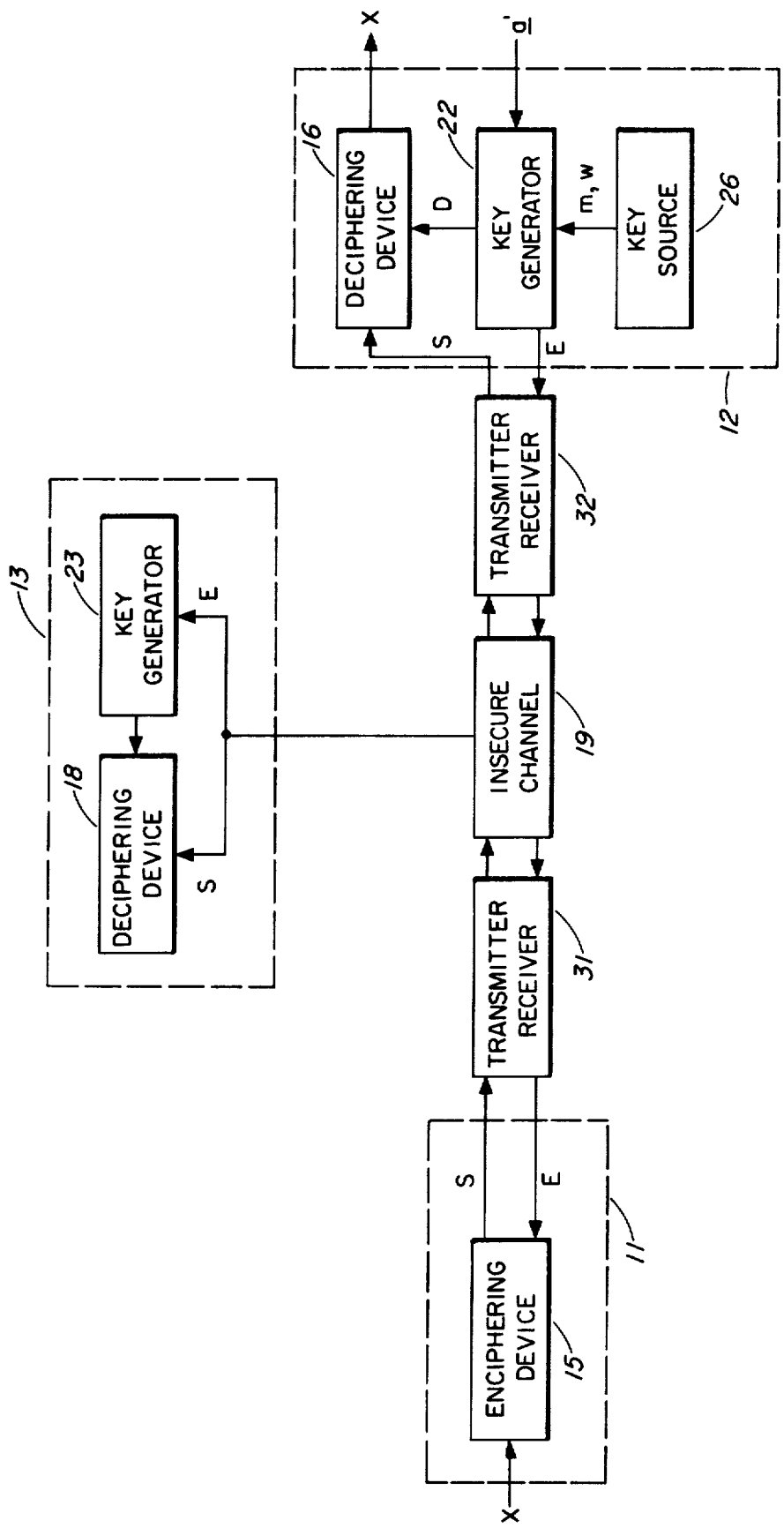
FIG. 1 is a block diagram of a public key cryptosystem that transmits a computationally secure cryptogram over an insecure communication channel.

Referring to FIG. 1, a public key cryptosystem is shown in which all transmissions take place over an insecure communication channel 19, for example a telephone line. Communication is effected on the insecure channel 19 between transmitter 11 and receiver 12 using transmitter-receiver units 31 and 32, which may be modems such as Bell 201 modems. Transmitter 11 possesses an unenciphered or plaintext message X to be communicated to receiver 12. Transmitter 11 and receiver 12 include an enciphering device 15 and deciphering device 16 respectively, for enciphering and deciphering information under the action of an enciphering key E on line E and a reciprocal deciphering key D on line D. The enciphering and deciphering devices 15 and 16 implement inverse transformations when loaded with the corresponding keys E and D. For example, the keys may be a sequence of random letters or digits. The enciphering device 15 enciphers the plaintext message X into an enciphered message or ciphertext S that is transmitted by transmitter 11 through the insecure channel 19; the ciphertext S is received by receiver 12 and deciphered by deciphering device 16 to obtain the plaintext message X. An unauthorized party or eavesdropper 13 is assumed to have key generator 23 and deciphering device 18 and to have access to the insecure channel 19, so if he knew the deciphering key D he could decipher the ciphertext S to obtain the plaintext message X.

The example system makes use of the difficulty of the so-called "knapsack problem." Definitions of the knapsack problem exist in the literature, for example, Ellis Horowitz and Sartaj Sahni, "Computing Partitions with Applications to the Knapsack Problem", JACM, Vol. 21, No. 2, April 1974, pp. 277-292; and O. H. Ibarra and C. E. Kim, "Fast Approximation Algorithms for the Knapsack and Sum of Subset Problems", JACM, Vol. 22, No. 4, October 1975, pp. 464-468. The definition used here is adapted from R. M. Karp, "Reducibility Among Combinatorial Problems" in Complexity of Computer Computations, by R. E. Miller and J. W. Thatcher, eds., Plenum Press, New York (1972), pp. 85-104. Simply stated, given a one-dimensional knapsack of length S and a vector a composed of n rods of lengths $a_1, a_2, \ldots a_n$, the knapsack problem is to find a subset of the rods which exactly fills the knapsack, if such a subset exists. Equivalently, find a binary n-vector x of 0's and 1's such that $S = a*x$, if such an x exists, (* applied to vectors denotes dot product, applied to scalars denotes normal multiplication).

A supposed solution, x, is easily checked in at most n additions; but, to the best of current knowledge, finding a solution requires a number of operations which grows exponentially in n. Exhaustive trial and error search over all $2^n$ possible x's is computationally infeasible if n is larger than one or two hundred. Thus, it is computationally infeasible to invert the transformation; such transformations are characterized by the class of mathematical functions known as one-way cipher functions. A task is considered computationally infeasible if its cost as measured by either the amount of memory used or the computing time is finite but impossibly large, for example, on the order of approximately $10^{30}$ operations with existing computational methods and equipment.

Theory suggests the difficulty of the knapsack problem because it is an NP-complete problem, and is therefore one of the most difficult computational problems of a cryptographic nature. (See for example, A. V. Aho, J. E. Hopcraft and J. D. Ullman, *The Design and Analysis of Computer Algorithms*, Reading, Ma.; Addison-Wesley, 1974, pp. 363–404.) Its degree of difficulty, however, is dependent on the choice of a. If $a=(1, 2, 4, \ldots 2^{(n-1)})$, then solving for x is equivalent to finding the binary representation of S. Somewhat less trivially, if for all i, $$a_i > \sum_{j=1}^{i-1} a_j \tag{1}$$

then x is also easily found: $x_n = 1$ if and only if $S \geq a_n$, and, for $i = n-1, n-2, \ldots 1$, $x_i = 1$ if and only if $$S - \sum_{j=i+1}^{n} x_j * a_j \geq a_i \tag{2}$$

If the components of x are allowed to take on integer values between 0 and l then condition (1) can be replaced by $$a_i > l \sum_{j=1}^{i-1} a_j$$

and $x_i$ can be recovered as the integer part of $$(S - \sum_{j=i+1}^{n} x_j * a_j)/a_i.$$

Equation (2) for evaluating $x_i$ when $x_i$ is binary valued is equivalent to this rule for $l=1$.

A trap door knapsack is one in which careful choice of a allows the designer to easily solve for any x, but which prevents anyone else from finding the solution. Two methods will be described for constructing trap door knapsacks, but first a description of their use in a public key cryptosystem as shown in FIG. 1 is provided. Receiver 12 generates a trap door knapsack vector a, and either places it in a public file or transmits it to transmitter 11 over the insecure channel 19. Transmitter 11 represents the plaintext message X as a vector x of n 0's and 1's, computes $S=a*x$, and transmits S to receiver 12 over the insecure channel 19. Receiver 12 can solve S for x, but it is infeasible for eavesdropper 13 to solve S for x.

In one method for generating trap door knapsacks, the key generator 22, uses random numbers generated by key source 26 to select two large integers, m and w, such that w is invertible modulo m, (i.e., so that m and w have no common factors except 1). For example, the key source 26 may contain a random number generator that is implemented from noisy amplifiers (e.g., Fairchild μ 709 operational amplifiers) with a polarity detector. The key generator 22 is provided a knapsack vector, a' which satisfies (1) and therefore allows solution of $S'=a'*x$, and transforms the easily solved knapsack vector a' into a trap door knapsack vector a via the relation $$a_i = w * a'_i \bmod m \tag{3}$$

The vector a serves as the public enciphering key E on line E, and is either placed in a public file or transmitted over the insecure channel 19 to transmitter 11. The enciphering key E is thereby made available to both the transmitter 11 and the eavesdropper 13. The transmitter 11 uses the enciphering key E, equal to a, to generate the ciphertext S from the plaintext message X, represented by vector x, by letting $S=a*x$. However, because the $a_i$ may be psuedo-randomly distributed, the eavesdropper 13 who knows a, but not w or m, cannot feasibly solve a knapsack problem involving a to obtain the desired message x.

The deciphering device 16 of receiver 12 is given w, m and a' as its secret deciphering key D, and can easily compute $$\begin{align}
S' &= 1/w * S \bmod m \tag{4}\\
&= 1/w * \Sigma x_i * a_i \bmod m \tag{5}\\
&= 1/w * \Sigma x_i * w * a'_i \bmod m \tag{6}\\
&= \Sigma x_i * a'_i \bmod m \tag{7}
\end{align}$$

If m is chosen so that $$m > \Sigma a'_i \tag{8}$$

then (7) implies that S' is equal to $\Sigma x_i * a'_i$ in integer arithmetic as well as mod m. This knapsack is easily solved for x, which is also the solution to the more difficult trap door knapsack problem $S=a*x$. Receiver 12 is therefore able to recover the plaintext message X, represented as the binary vector x. But, the eavesdropper 13's trap door knapsack problem can be made computationally infeasible to solve, thereby preventing the eavesdropper 13 from recovering the plaintext message X.

To help make these ideas more clear, an illustrative example is given in which $n=5$. Taking $m=8443$, $a'=(171, 196, 457, 1191, 2410)$, and $w=2550$, then $a=(5457, 1663, 216, 6013, 7439)$. Given $x=(0, 1, 0, 1, 1)$ the enciphering device 15 computes $S=1663+6013+7439=15115$. The deciphering device 16 uses Euclid's algorithm (see for instance, D. Knuth, *The Art of Computer Programming*, vol. II, Addison-Wesley, 1969, Reading Ma.) to compute $1/w=3950$ and then computes $$\begin{align}
S' &= 1/w * S \bmod m \tag{9}\\
&= 3950 * 15115 \bmod 8443\\
&= 3797
\end{align}$$

Because $S' > a_5'$, the deciphering device 16 determines that $x_5=1$. Then, using (2) for the a' vector, it determines that $x_4=1$, $x_3=0$, $x_2=1$, $x_1=0$ or $x=(0, 1, 0, 1, 1)$, which is also the correct solution to $S=a*x$.

The eavesdropper, 13 who does not know m, w or a' has great difficulty in solving for x in $S=a*x$ even though he knows the method used for generating the trap door knapsack vector a. His task can be made infeasible by choosing larger values for n, m, w and a'. His task can be further complicated by scrambling the order of the $a_i$, and by adding different random multiples of m to each of the $a_i'$.

The example given was extremely small in size and only intended to illustrate the technique. Using $n=100$ (which is the lower end of the usable range for high security systems at present) as a more reasonable value, it is suggested that m be chosen approximately uniformly from the numbers between $2^{201}+1$ and $2^{202}-1$; that $a_1'$ be chosen uniformly from the range $(1, 2^{100})$; that $a_2'$ be chosen uniformly from $(2^{100}+1, 2*2^{100})$; that $a_3'$ be chosen uniformly from $(3 \times 2^{100}+1, 4*2^{100})$; . . . and that $a_i'$ be chosen uniformly from $((2^{i-1}-1)*2^{100}+1, 2^{i-1}*2^{100})$; and that w' be chosen uniformly from $(2, m-2)$ and then divided by the greatest common divisor of (w', m) to yield w.

These choices ensure that (8) is met and that an eavesdropper 13 has at least $2^{100}$ possibilities for each parameter and hence cannot search over them all.

Figure 2:
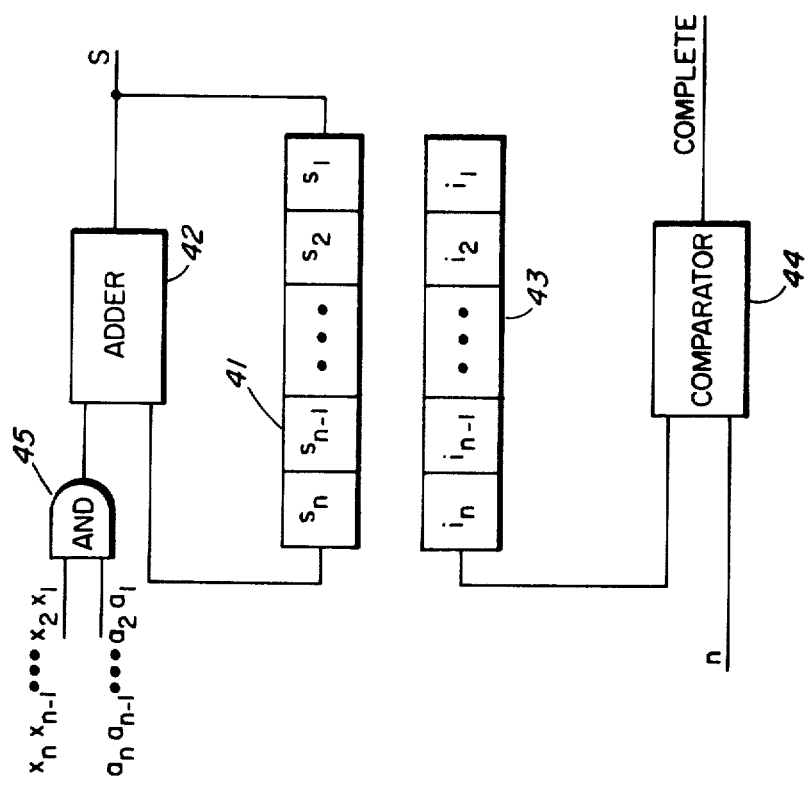
FIG. 2 is a block diagram of an enciphering device for enciphering a message into ciphertext in the public key cryptosystem of FIG. 1.

The enciphering device 15 is shown in FIG. 2. The sequence of integers $a_1, a_2, \ldots a_n$ is presented sequentially in synchronization with the sequential presentation of 0's and 1's of $x_1, x_2, \ldots x_n$. The S register 41 is initially set to zero. If $x_i=1$ the S register 41 contents are $a_i$ are added by adder 42 and the result placed in the S register 41. If $x_i=0$ the contents of the S register 41 are left unchanged. In either event, i is replaced by $i+1$ until $i=n$, in which case the enciphering operation is complete. The i register 43 is initially set to zero and incremented by 1 after each cycle of the enciphering device. Either the adder 42, or a special up counter can be used to increment the i register 43 contents. With the range of values suggested above, the S and i registers 41 and 43 both can be obtained from a single 1024 bit random access memory (RAM) such as the Intel 2102. The implementation of the adder 42 will be described in more detail later, as will the implementation of a comparator 44 required for comparing i and n to determine when the enciphering operation is complete.

Figure 3:
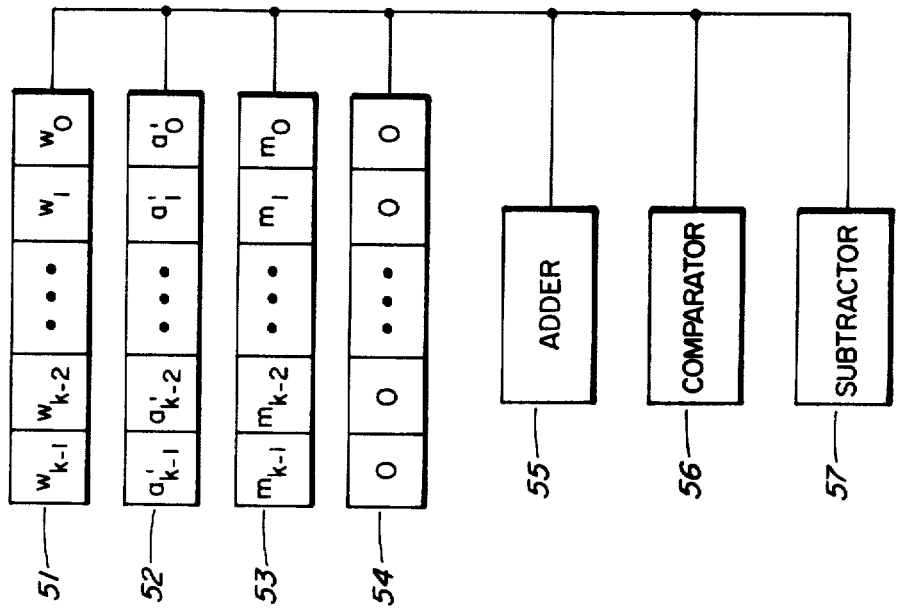
FIG. 3 is a block diagram of a multiplier for performing modular multiplications in the deciphering device of FIG. 7, the exponentiator of FIG. 10, and the public key generator of FIG. 11.

The key generaor 22 comprises a modulo m multiplier, such as that depicted in FIG. 3, for producing $a_i = w*a_i'$ mod m. The two numbers w and $a_i'$ to be multiplied are loaded into the W and A' registers 51 and 52 respectively, and m is loaded into the M register 53. The product $w*a_i'$ modulo m will be produced in the P register 54 which is initially set to zero. If k, the number of bits in the binary representation of m, is 200, then all four registers can be obtained from a single 1024 bit RAM such as the Intel 2102. The implementation of FIG. 3 is based on the fact that $wa_i'$ mod $m = w_0 a_i'$ mod $m + 2 \ w_1 a_i'$ mod $m + 4 \ w_2 a_i'$ mod $m + \ldots + 2^{k-1} w_{k-1} a_i'$ mod m.

To multiply w times $a_i'$, if the rightmost bit, containing $w_0$ of the W register 51 is 1 then the contents of the A' register 53 are added to the P register 54 by adder 55. If $w_0=0$, then the P register 54 is unchanged. Then the M and P register contents are compared by comparator 56 to determine if the contents of the P register 54 are greater than or equal to m, the contents of the M register 53. If the contents of the P register 54 are greater than or equal to m then subtractor 57 subtracts m from the contents of the P register 54 and places the difference in the P register 54, if less than m the P register 54 is unchanged.

Next, the contents of W register 51 are shifted one bit to the right and a 0 is shifted in at the left so its contents become $0w_{k-1} w_{k-2} \ldots w_2 w_1$, so that w is ready for computing $2w_1 a'$ mod m. The quantity of $2a'$ mod m is computed for this purpose by using adder 55 to add a' to itself, using comparator 56 to determine if the result, $2a'$, is less than m, and using subtractor 57 for subtracting m from $2a'$ if the result is not less than m. The result, $2a'$ mod m is then stored in the A' register 52. The rightmost bit, containing $w_1$, of the W register 51 is then examined, as before, and the process repeats.

This process is repeated a maximum of k times or until the W register 51 contains all 0's, at which point wa' modulo m is stored in the P register 54.

As an example of these operations, consider the problem of computing $7 \times 7$ modulo 23. The following steps show the successive contents of the W, A' and P registers which result in the answer $7 \times 7 = 3$ modulo 23.

| i | W (in binary) | A' | P |
|---|---|---|---|
| 0 | 00111 | 7 | 0 |
| 1 | 00011 | 14 | 0 + 7 = 7 |
| 2 | 00001 | 5 | 7 + 14 = 21 |
| 3 | 00000 | 10 | 21 + 5 = 3 mod 23 |

Figure 4:
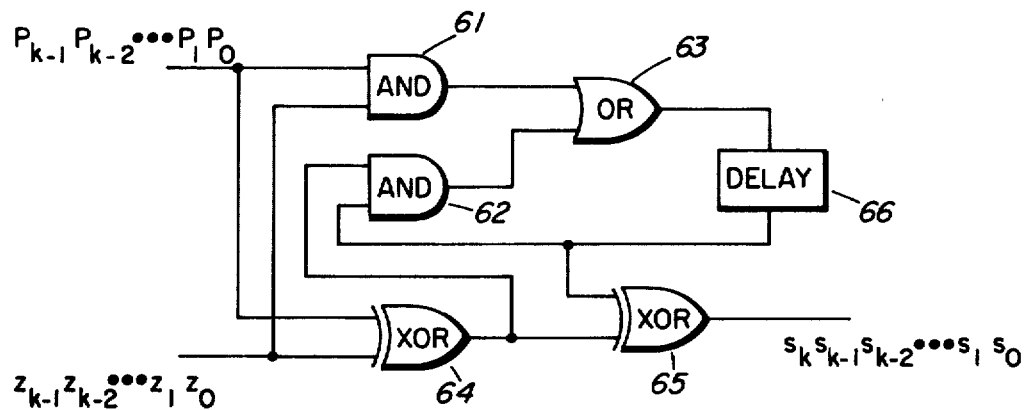
FIG. 4 is a detailed schematic diagram of an adder for performing additions in the enciphering device of FIG. 2, the multiplier of FIG. 3, and the public key generator of FIG. 11.

FIG. 4 depicts an implementation of an adder 42 or 55 for adding two k bit numbers p and z. The numbers are presented one bit at a time to the device, low order bit first, and the delay element is initially set to 0. (The delay represents the binary carry bit.) The AND gate 61 determines if the carry bit should be a one based on $p_i$ and $z_i$ both being 1 and the AND gate 62 determines if the carry should be 1 based on the previous carry being a 1 and one of $p_i$ or $z_i$ being 1. If either of these two conditions is met, the OR gate 63 has an output of 1 indicating a carry to the next stage. The two exclusive-or (XOR) gates 64 and 65 determine the $i^{th}$ bit of the sum, $s_i$, as the modulo-2 sum of $p_i$, $z_i$ and the carry bit from the previous stage. The delay 66 stores the previous carry bit. Typical parts for implementing these gates and the delay are SN7400, SN7404, and SN7474.

Figure 5:
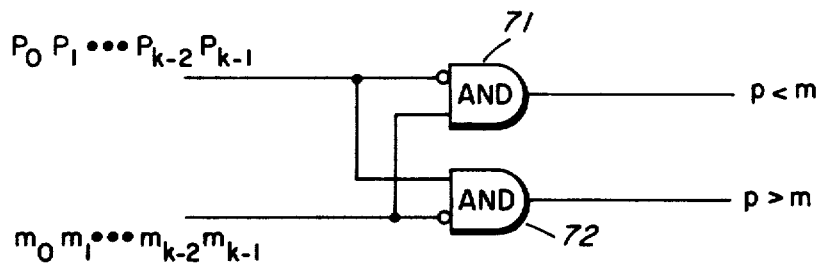
FIG. 5 is a detailed schematic diagram of a comparator for performing magnitude comparisons in the enciphering device of FIG. 2, the multiplier of FIG. 3, the deciphering device of FIG. 7, the divider of FIG. 8, and the alternative deciphering device of FIG. 9.

FIG. 5 depicts an implementation of a comparator 44 or 56 for comparing two numbers p and m. The two numbers are presented one bit at a time, high order bit first. If neither the p<m nor the p>m outputs have been triggered after the last bits $p_o$ and $m_o$ have been presented, then $p=m$. The first triggering of either the p<m or the p>m output causes the comparison operation to cease. The two AND gates 71 and 72 each have one input inverted (denoted by a circle at the input). An SN7400 and SN7404 provide all of the needed logic circuits.

Figure 6:
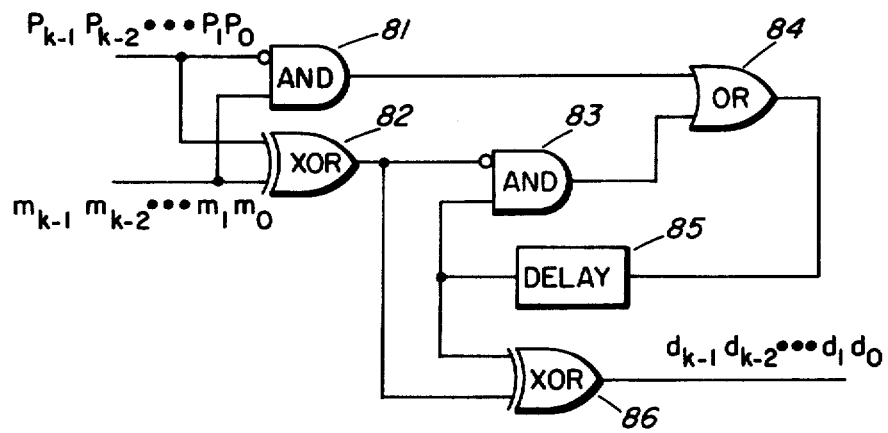
FIG. 6 is a detailed schematic diagram of a subtractor for performing subtraction in the multiplier of FIG. 3, the deciphering device of FIG. 7, and the dividier of FIG. 8.

FIG. 6 depicts an implementation of a subtractor 57 for subtracting two numbers. Because the numbers subtracted in FIG. 3 always produce a non-negative difference, there is no need to worry about negative differences. The larger number, the minuend, is labelled p and the smaller number, the subtrahend, is labelled m. Both p and m are presented serially to the subtractor 57, low order bit first. AND gates 81 and 83, OR gate 84 and XOR gate 82 determine if borrowing (negative carrying) is in effect. A borrow occurs if either $p_i=0$ and $m_i=1$, or $p_i=m_i$ and borrowing occurred in the previous stage. The delay 85 stores the previous borrow state. The ith bit of the difference, $d_i$, is computed as the XOR, or modulo-2 difference, of $p_i$, $m_i$ and the borrow bit. The output of XOR gate 82 gives the modulo-2 difference between $p_i$ and $m_i$, and XOR gate 86 takes the modulo-2 difference of this with the previous borrow bit. Typical parts for implementing these gates and the delay are SN7400, SN7404 and SN7474.

Figure 7:
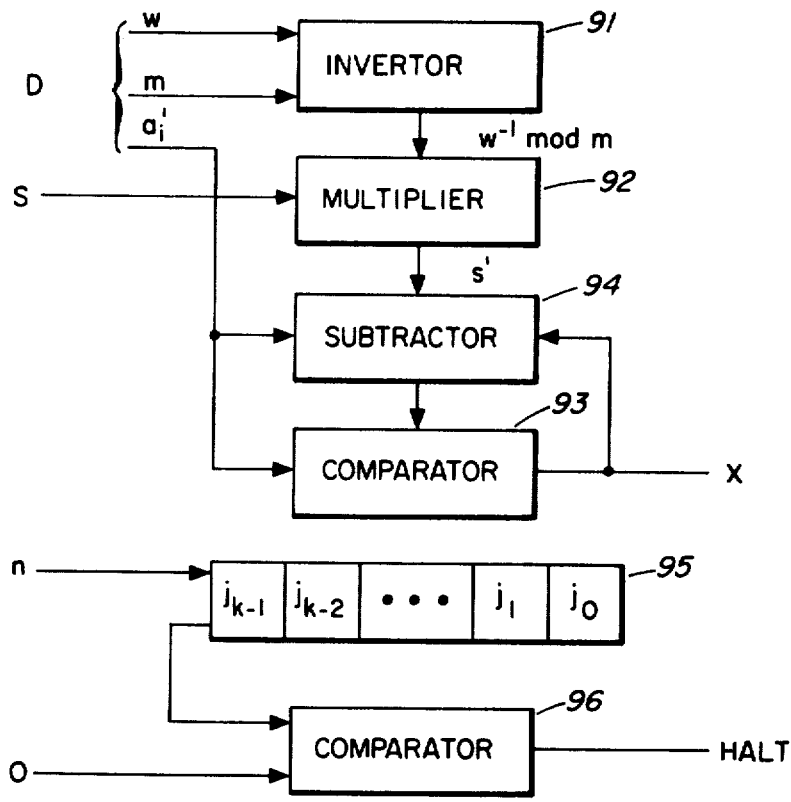
FIG. 7 is a block diagram of a deciphering device for deciphering a ciphertext into message in the public key cryptosystem of FIG. 1.

The deciphering device 16 is depicted in FIG. 7. It is given the ciphertext S, and the deciphering key consisting of w, m and a', and must compute x.

To compute x, first, w and m are input to a modulo m invertor 91 which computes $w^{-1}$ mod m. It then uses the modulo m multiplier 92 to compute $S' = w^{-1} S$ mod m. As noted in equations (7) and (8), $S' = a'*x$, which is easily solved for x. The comparator 93 then compares S' with $a_n'$ and decides that $x_n = 1$ if $S' \geq a_n'$ and that $x_n = 0$ if $S' < a_n'$. If $x_n = 1$, S' is replaced by $S' - a_n'$, computed by the subtractor 94. If $x_n = 0$, S' is unchanged. The process is repeated for $a_{n-1}'$ and $x_{n-1}$ and continues until x is computed. The j register 95 is initially set to n and is decremented by 1 after each stage of the deciphering process until $j=0$ results, causing a halt to the process and signifying x is computed. Either the subtractor 94 or a down counter can be used to decrement the contents of the j register 95. The comparator 96 can be used to compare the contents of the j register 95 with zero to determine when to halt the process. The modulo m multiplier 92 is detailed in FIG. 3; the comparator 93 is detailed in FIG. 5; and, the subtractor 94 is detailed in FIG. 6. The modulo m invertor 91 can be based on a well known extended version of Euclid's algorithm. (See for instance, D. Knuth, *The Art of Computer Programming*, Vol. II, Addison-Wesley, 1969, Reading, Ma., p. 302 and p. 315 problem 15.) As described by Knuth, an implementation requires six registers, a comparator, a divider and a subtractor. All of these devices have already been detailed with the exception of the divider.

Figure 8:
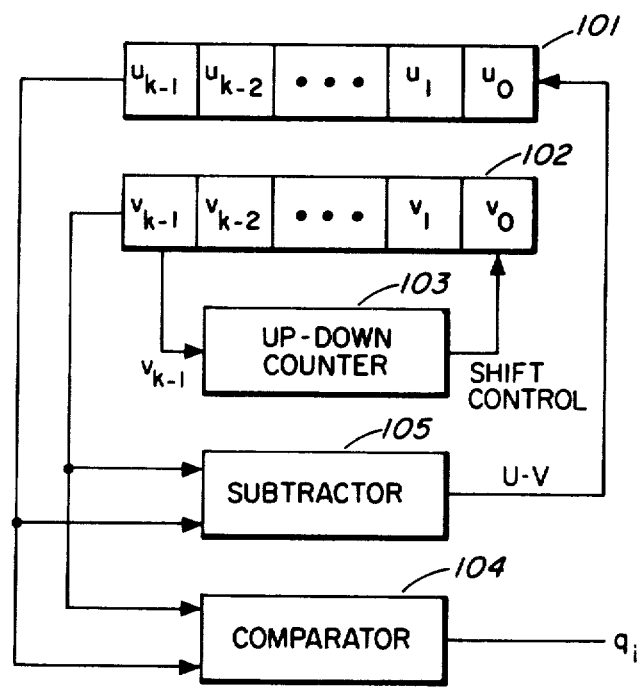
FIG. 8 is a block diagram of a divider for performing division in the invertor of FIG. 7 and the alternative deciphering device of FIG. 9.

FIG. 8 details an apparatus for dividing an integer u by another integer v to compute a quotient q and a remainder r, such that $0 \leq r \leq v-1$. First, u and v, represented as binary numbers, are loaded into the U and V registers 101 and 102, respectively. Then v, the contents of the V register 102, are shifted to the left until a 1 appears in $v_{k-1}$, the leftmost bit of the V register 102. This process can be effected by using the complement of $v_{k-1}$ to drive the shift control on a shift register, such as the Signetics 2533, which was initially set to zero. The contents of the up-down counter 103 equal the number of bits in the quotient less one.

After this initialization, v, the contents of the V register 102 are compared with the contents of the U register 101 by the comparator 104. If $v > u$ then $q_n$, the most significant bit of the quotient, is 0 and u is left unchanged. If $v \leq u$ then $q_n = 1$ and u is replaced by u-v as computed by the subtractor 105. In either event, v is shifted to the right one bit and the $v > u$ comparison is repeated to compute $q_{n-1}$, the next bit in the quotient.

This process is repeated, with the up-down counter 103 being decremented by 1 after each iteration until it contains zero. At that point, the quotient is complete and the remainder r is in the U register 101.

As an example, consider dividing 14 by 4 to produce $q=3$ and $r=2$ with $k=4$ being the register size. Because $u = 14 = 1110$ and $v = 4 = 0100$ in binary form, the V register 101 is left shifted only once to produce $v = 1000$. After this initialization, it is found that $v \leq u$ so the first quotient bit $q_1 = 1$, and u is replaced by u-v; v is replaced by v right shifted one bit and the up-down counter 103 is decremented to zero. This signals that the last quotient bit, $q_0$, is being computed, and that after the present iteration the remainder, r, is in the U register. The following sequence of register contents helps in following these operations.

| U | V | counter | $q_i$ |
|---|---|---|---|
| 1110 | 1000 | 1 | 1 |
| 0110 | 0100 | 0 | 1 |
| 0010 | — | halt | — |

It is seen that $q=11$ in binary form and is equivalent to $q=3$, and that $r=0010$ in binary form and is equivalent to $r=2$.

Another method for generating a trap door knapsack vector a uses the fact that a multiplicative knapsack is easily solved if the vector entries are relatively prime. Given $a'=(6, 11, 35, 43, 169)$ and a partial product $P=2838$, it is easily determined that $P=6*11*43$ because 6, 11 and 43 evenly divide P but 35 and 169 do not. A multiplicative knapsack is transformed into an additive knapsack by taking logarithms. To make both vectors have reasonable values, the logarithms are taken over GF(m), the Galois (finite) field with m elements, where m is a prime number. It is also possible to use non-prime values of m, but the operations are somewhat more difficult.

A small example is again helpful. Taking $n=4$, $m=257$, $a'=(2, 3, 5, 7)$ and the base of the logarithms to be $b=131$ results in $a=(80, 183, 81, 195)$. That is $131^{80}=2$ mod 257; $131^{183}=3$ mod 257; etc. Finding logarithms over GF (m) is relatively easy if $m-1$ has only small prime factors.

Now, if the deciphering device 16 is given $S = 183 + 81 = 264$, it uses the deciphering key D consisting of m, a' and b, to compute $$S' = b^S \bmod m \quad (10)$$
$$= 131^{264} \bmod 257$$
$$= 15$$
$$= 3 * 5$$
$$= a_1'^0 * a_2'^1 * a_3'^1 * a_4'^0$$

which implies that $x=(0, 1, 1, 0)$. This is because $$b^S = b^{(\Sigma a_i * x_i)} \quad (11)$$
$$= \pi \, b^{(a_i * x_i)} \quad (12)$$
$$= \pi \, a_i'^{x_i} \bmod m \quad (13)$$

However, it is necessary that $$\pi_{i=1}^{n} a_i' < m \quad (14)$$

to ensure that $\pi a_i'^{x_i}$ mod m equals $\pi a_i'^{x_i}$ in arithmetic over the integers.

The eavesdropper 13 knows the enciphering key E, comprised of the vector a, but does not know the deciphering key D and faces a computationally infeasible problem.

The example given was again small and only intended to illustrate the technique. Taking $n=100$, if each $a_i'$ is a random, 100 bit prime number, then m would have to be approximately 10,000 bits long to ensure that (14) is met. While a 100:1 data expansion is acceptable in certain applications (e.g., secure key distribution over an insecure channel), it probably is not necessary for an opponent to be so uncertain of the $a_i'$. It is even possible to use the first n primes for the $a_i'$, in which case m could be as small as 730 bits long when $n=100$ and still meet condition (14). As a result, there is a possible tradeoff between security and data expansion.

Figure 9:
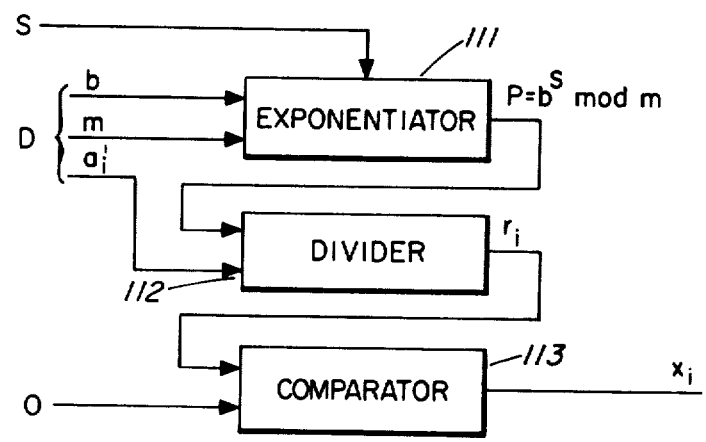
FIG. 9 is a block diagram of an alternative deciphering device for deciphering a ciphertext into message in the public key cryptosystem of FIG. 1.

In this embodiment, the enciphering device 15 is of the same form as detailed in FIG. 2 and described above. The deciphering device 16 of the second embodiment is detailed in FIG. 9. The ciphertext S and part of the deciphering key D, namely b and m, are used by the exponentiator 111 to compute $P=b^S$ mod m. As noted in equations (12) to (14) and in the example, P is a partial product of the $\{a_i\}$, also part of the deciphering key D. The divider 112 divides P by $a_i'$ for $i=1, 2, \ldots n$ and delivers only the remainder $r_i$, to the comparator 113. If $r_i=0$ then $a_i'$ evenly divides P and $x_i=1$. If $r_i \neq 0$ then $x_i=0$. The divider 112 may be implemented as detailed in FIG. 8 and described above. The comparator 113 may be implemented as detailed in FIG. 5 and described above; although, more efficient devices exist for comparing with zero.

Figure 10:
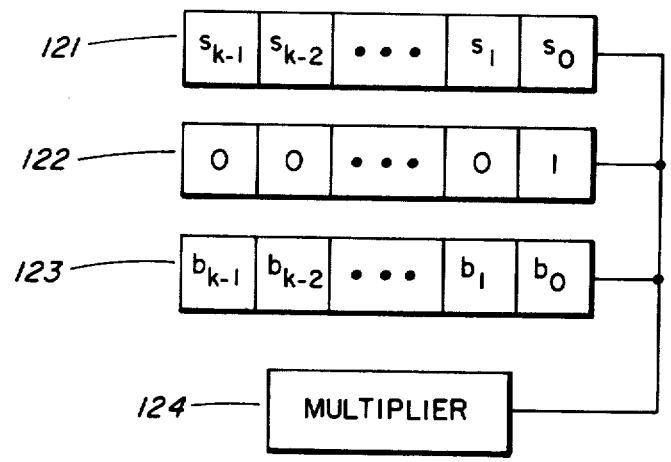
FIG. 10 is an exponentiator for raising various numbers to various powers in modulo arithmetic in the alternative deciphering device of FIG. 9 and the public key generator of FIG. 11.

The exponentiator 111, for raising b to the S power modulo m, can be implemented in electronic circuitry as shown in FIG. 10. FIG. 10 shows the initial contents of three registers 121, 122 and 123. The binary representation of S ($s_{k-1} s_{k-2} \ldots s_1 s_0$) is loaded into the S register 121; 1 is loaded into the R register 122; and the binary representation of b is loaded into the B register 123, corresponding to $i=0$. The number of bits k in each register is the least integer such that $2^k \geq m$. If $k=200$, then all three registers can be obtained from a single 1024 bit random access memory (RAM) such as the Intel 2102. The implementation of multiplier 124, for multiplying two numbers modulo m, has been described in detail in FIG. 3.

Referring to FIG. 10, if the low order bit, containing $s_0$, of the S register 121 equals 1 then the R register 122 and the B register 123 contents are multiplied modulo m and their product, also a k bit quantity, replaces the contents of the R register 122. If $s_0=0$, the R register 122 contents are left unchanged. In either case, the B register 123 is then loaded twice into the multiplier 124 so that the square, modulo m, of the B register 123 contents is computed. This valve, $b^{(2i+1)}$, replaces the contents of the B register 123. The S register 121 contents are shifted one bit to the right and a 0 is shifted in at the left so its contents are now $0 s_{k-1} s_{k-2} \ldots s_2 s_1$.

The low order bit, containing $s_1$, of the S register 121 is examined. If it equals 1 then, as before, the R register 122 and B register 123 contents are multiplied modulo m and their product replaces the contents of the R register 122. If the low order bit equals 0 then the R register 122 contents are left unchanged. In either case, the contents of the B register 123 are replaced by the square, modulo m, of the previous contents. The S register 121 contents are shifted one bit to the right and a 0 is shifted in at the left so its contents are now $00 s_{k-1} s_{k-2} \ldots s_3 s_2$.

This process continues until the S register 121 contains all 0's, at which point the value of $b^S$ modulo m is stored in the R register 122.

An example is helpful in following this process. Taking $m=23$, we find $k=5$ from $2^k \geq m$. If $b=7$ and $S=18$ then $b^s = 7^{18} = 1628413597910449 = 23(70800591213497) + 18$ so $b^s$ modulo m equals 18. This straightforward but laborious method of computing $b^s$ modulo m is used as a check to show that the method of FIG. 10, shown below, yields the correct result. The R register 122 and B register 123 contents are shown in decimal form to facilitate understanding.

| i | S (in binary) | R | B |
|---|---|---|---|
| 0 | 10010 | 1 | 7 |
| 1 | 01001 | 1 | 3 |
| 2 | 00100 | 3 | 9 |
| 3 | 00010 | 3 | 12 |
| 4 | 00001 | 3 | 6 |
| 5 | 00000 | 18 | 13 |

The row marked $i=0$ corresponds to the initial contents of each register, $S=18$, $R=1$ and $B=b=7$. Then, as described above, because the right most bit of S register 121 is 0, the R register 122 contents are left unchanged, the contents of the B register 123 are replaced by the square, modulo 23, of its previous contents ($7^2=49=2\times23+3=3$ modulo 23), the contents of the S register 121 are shifted one bit to the right, and the process continues. Only when $i=1$ and 4 do the rightmost bit of the S register 121 contents equal 1, so only going from $i=1$ to 2 and from $i=4$ to 5 is the R register 122 replaced by RB modulo m. When $i=5$, $S=0$ so the process is complete and the result, 18, is in the R register 122.

Note that the same result, 18, is obtained here as in the straightforward calculation of $7^{18}$ modulo 23, but that here large numbers never resulted.

Another way to understand the process is to note that the B register 123 contains b, $b^2$, $b^4$, $b^8$ and $b^{16}$ when $i=0, 1, 2, 3$ and 4 respectively, and that $b^{18}=b^{16}b^2$, so only these two values need to be multiplied.

The key generator 22 used in the second embodiment is detailed in FIG. 11. A table of n small prime numbers, $p_i$, is created and stored in source 131, which may be a read only memory such as the Intel 2316E. The key source 26, as described above, generates random numbers, $e_i$. The small prime numbers from the source 131 are each raised to a different power, represented by a random number $e_i$ from key source 26, by the exponentiator 132 to generate $p_i^{e_i}$ for $i=1$ to n. The multiplier 133 then computes the product of all the $p_i^{e_i}$ which may be represented as $$\prod_\pi^n p_i^{e_i}.$$

The product of all the $$p_i^{e_i}, \prod_\pi^n p_i^{e_i},$$

then is incremented by one by adder 134 to generate the potential value of m. If it is desired that m be prime, the potential value of m may be tested for primeness by prime tester 135.

Prime testers for testing a number m for primeness when the factorization of $m-1$ is known $$\text{(as here, } m - 1 = \prod_{i=1}^n p_i^{e_i}\text{)},$$

are well documented in the literature. (See for instance, D. Knuth, *The Art of Computer Programming*, vol. II, Seminumerical Algorithms, pp. 347–48.) As described in the above reference, the prime tester 135 requires only a means for exponentiating various numbers to various powers modulo m, as described in FIG. 10. When a potential value of m is found to be prime, it is output by the public key generator of FIG. 11 as the variable m. The a' vector's elements, $a_i'$, can then be chosen to be the n small prime numbers, $p_i$, from source 131.

The base, b, of the logarithms is then selected as a random number by the key source 26.

The elements of the vector a are computed by the logarithmic convertor 136 as the logarithms, to the base b, of the elements of the a' vector over GF(m). The operation and structure of a logarithmic convertor 136 is described below.

It is well known that if p is prime then $$z^{p-1} = 1 \text{ (mod p)}, \quad 1 \leq z \leq p-1 \quad (15)$$

Consequently arithmetic in the exponent is done modulo $p-1$, not modulo p. That is $$z^x = z^{x(\bmod\, p-1)} \text{ (mod p)} \quad (16)$$

for all integers x.

The algorithm for computing logarithms mod p is best understood by first considering the special case $p = 2^n + 1$. We are given $\alpha$, p and y, with $\alpha$ a primitive element of GF(p), and must find x such that $y = \alpha^x$ (mod p). We can assume $0 \leq x \leq p-2$, since $x = p-1$ is indistinguishable from $x = 0$.

When $p = 2^n + 1$, x is easily determined by finding the binary expansion $\{b_0, \ldots, b_{n-1}\}$ of x. The least significant bit, $b_0$, of x is determined by raising y to the $(p-1)/2 = 2^{n-1}$ power and applying the rule $$y^{(p-1)/2} \text{(mod p)} = \begin{cases} +1, & b_0 = 0 \\ -1, & b_0 = 1. \end{cases} \quad (17)$$

This fact is established by noting that since $\alpha$ is primitive $$\alpha^{(p-1)/2} = -1 \text{ (mod p),} \quad (18)$$

and therefore $$y^{(p-1)/2} = (\alpha^x)^{(p-1)/2} = (-1)^x \text{ (mod p).} \quad (19)$$

The next bit in the expansion of x is then determined by letting $$z = y\alpha^{-b_0} = \alpha^{x_1} \text{ (mod p)} \quad (20)$$

where $$x_1 = \sum_{i=1}^{n-1} b_i 2^i. \quad (21)$$

Clearly $x_1$ is a multiple of 4 if and only if $b_1 = 0$. If $b_1 = 1$ then $x_1$ is divisible by 2, but not by 4. Reasoning as before, $$z^{(p-1)/4} \text{(mod p)} = \begin{cases} +1, & b_1 = 0 \\ -1, & b_1 = 1. \end{cases} \quad (22)$$

Figure 12:
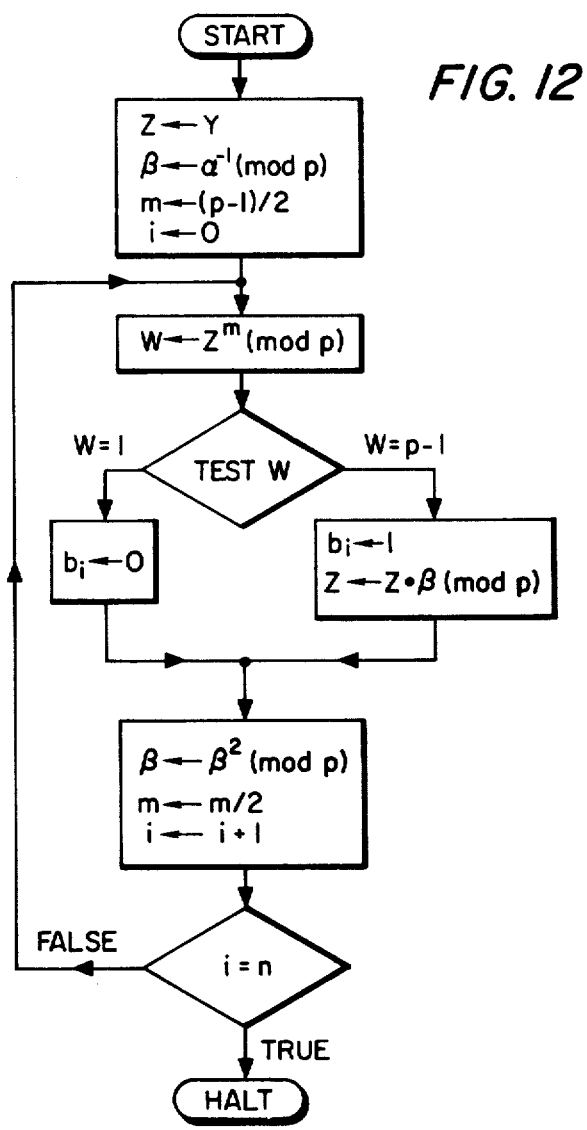
FIG. 12 is a flow chart for the algorithm of the logarithmic converter of FIG. 11 when $p-1$ is a power of 2.

The remaining bits of x are determined in a similar manner. This algorithm is summarized in the flow chart of FIG. 12.

To aid in understanding this flowchart, note that at the start of the $i^{th}$ loop, $$m = (p-1)/2^{i+1} \quad (23)$$

and $$z = \alpha^{x_i} \text{ (mod p)} \quad (24)$$

where $$x_i = \sum_{j=i}^{n-1} b_j 2^j. \quad (25)$$

Thus raising z to the $m^{th}$ power gives $$z^m = \alpha^{(x_i m)} = \alpha^{[(p-1)/2] \cdot (x_i/2^i)} \quad (26)$$
$$= (-1)^{x_i/2^i} = (-1)^{b_i} \text{ (mod p),}$$

so that $z^m = 1$ (mod p) if and only if $b_i = 0$, and $z^m = -1$ (mod p) if and only if $b_i = 1$.

As an example, consider $p = 17 = 2^4 + 1$. Then $\alpha = 3$ is primitive ($\alpha = 2$ is not primitive because $2^8 = 256 = 1$, mod 17). Given $y = 10$ the algorithm computes x as follows (note that $\beta = x^{-1} = 6$ since $3 \times 6 = 18 = 1$, mod 17):

| i | z | β | m | W | $b_i$ |
|---|---|---|---|---|---|
| 0 | 10 | 6 | 8 | 16 | 1 |
| 1 | 9 | 2 | 4 | 16 | 1 |
| 2 | 1 | 4 | 2 | 1 | 0 |
| 3 | 1 | 16 | 1 | 1 | 0 |
| 4 | | | 1 | | |

It thus finds that $x = 2^0 + 2^1 = 3$. This is correct because $\alpha^3 = 3^3 = 27 = 10$ (mod 17).

We now generalize this algorithm to arbitrary primes p. Let $$p - 1 = p_1^{n_1} p_2^{n_2} \cdots p_k^{n_k}, \quad p_i < p_{i+1} \quad (27)$$

be the prime factorization of $p-1$, where the $p_i$ are distinct primes, and the $n_i$ are positive integers. The value of x (mod $p_i^{n_i}$) will be determined for $i = 1, \ldots, k$ and the results combined via the Chinese remainder theorem to obtain $$x \text{ (mod } \prod_{i=1}^{k} p_i^{n_i}) = x \text{ (mod } p - 1) = x \quad (28)$$

since $0 \leq x \leq p-2$. The Chinese remainder theorem can be implemented in $O(k \log_2 p)$ operations and $O(k \log_2 p)$ bits of memory. (We count a multiplication mod p as one operation.)

Consider the following expansion of x (mod $p_i^{n_i}$).

$$x \text{ (mod } p_i^{n_i}) = \sum_{j=0}^{n_i - 1} b_j p_i^j \quad (29)$$

where $0 \leq b_j \leq p_i - 1$.

The least significant coefficient, $b_0$, is determined by raising y to the $(p-1)/p_i$ power, $$y^{(p-1)/p_i} = \alpha^{(p-1)x/p_i} = \gamma_i^x = (\gamma_i)^{b_0} \text{ (mod p)} \quad (30)$$

where ti $\gamma_i = \alpha^{(p-1)/p_i}$ (mod p)  (31)

is a primitive $p_i^{th}$ root of unity. There are therefore only $p_i$ possible values for $y^{(p-1)/p_i}$ (mod p), and the resultant value uniquely determines $b_0$.

The next digit, $b_1$, in the base $p_i$ expansion of x (mod $p_i^{n_i}$) is determined by letting $$z = y \cdot \alpha^{-b_0} = \alpha^{x_1} \text{ (mod p)},$$  (32)

where $$x_1 = \sum_{j=1}^{n_i-1} b_j p_i^j.$$  (33)

Now, raising z to the $(p-1)/p_i^2$ power yields $$z^{(p-1)/p_i^2} = \alpha^{(p-1) \cdot x_1/p_i^2} = \gamma_i^{x_1/p_i} = (\gamma_i)^{b_1} \text{ (mod p)}.$$  (34)

Again, there are only $p_i$ possible values of $z^{(p-1)/p_i^2}$ and this value determines $b_1$. This process is continued to determine all the coefficients, $b_j$.

Figure 13:
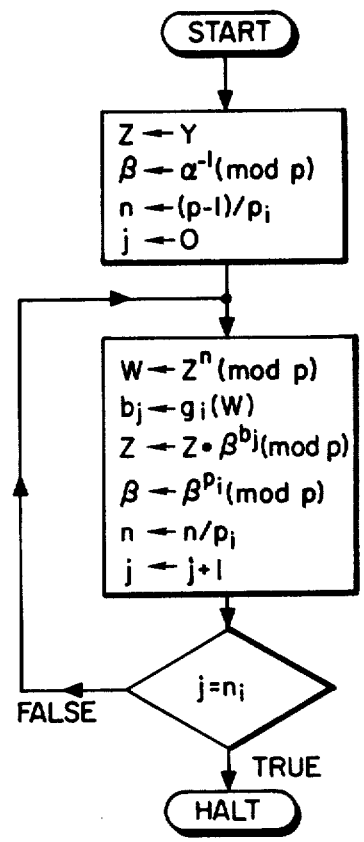
FIG. 13 is a flow chart for the algorithm for computing the coefficients $\{b_j\}$ of the expansion $$x(\bmod p_i^{n_i}) = \sum_{j=0}^{n_i-1} b_j p_i^j$$

The flow chart of FIG. 13 summarizes the algorithm for computing the coefficients ($b_j$) of the expansion (29). This algorithm is used k times to compute x (mod $p_i^{n_i}$) for $i = 1, 2, \ldots k$, and these results are combined by the Chinese remainder theorem to obtain x. The function $g_i(w)$ in FIG. 13 is defined by $$\gamma_i^{g_i(w)} = w \text{ (mod p)}, \quad 0 \leq g_i(w) \leq p_i - 1,$$  (35)

where $\gamma_i$ is defined in (31).

If all prime factors, $\{p_i\}_{i=1}^k$, of $p-1$ are small then the $g_i(w)$ functions are easily implemented as tables, and computing a logarithm over GF(p) requires $O(\log_2 p)^2$ operations and only minimal memory for the $g_i(w)$ tables. The dominant computational requirement is computing $w = z^n$, which requires $O(\log_2 p)$ operations. This loop is traversed $$\sum_{i=1}^k n_i$$

times, and if all $p_i$ are small, $$\sum_{i=1}^k n_i$$

is approximately $\log_2 p$. Thus when $p-1$ has only small prime factors it is possible to compute logarithms over GF(p) easily.

As an example, consider $p = 19$, $\alpha = 2$, $y = 10$. Then $p - 1 = 2 \cdot 3^2$ and $p_1 = 2$, $n_1 = 1$, $p_2 = 3$ and $n_2 = 2$. The computation of x (mod $p_1^{n_1}$) = x (mod 2) involves computing $y^{(p-1)/p_1} = \alpha^9 = 512 = 18$ (mod 19) so $b_1 = 1$ and x (mod 2) = $2^0 = 1$ (i.e., x is odd). Next the flow chart of FIG. 13 is re-executed for $p_2 = 3$ $n_2 = 2$ as follows ($\beta = 10$ because $2 \times 10 = 20 = 1$, mod 19; further $\gamma_2 = \alpha^6 = 7$ and $7^0 = 1$, $7^1 = 7$, and $7^2 = 11$ (mod 19) so $g_2(1) = 0$, $g_2(7) = 1$ and $g_2(11) = 2$):

| Z | B | n | j | W | $b_j$ |
|---|---|---|---|---|---|
| 10 | 10 | 6 | 0 | 11 | 2 |
| 12 | 12 | 2 | 1 | 11 | 2 |
| 18 | 18 | 1 | 2 | | | so that x (mod $p_2^{n_2}$) = x (mod 9) = $2 \cdot 3^0 + 2 \cdot 3^1 = 8$.

Knowing that x (mod 2) = 1 and that x (mod 9) = 8 implies that x (mod 18) = 17. (Either the Chinese Remainder Theorem can be used, or it can be realized that $x = 8$ or $x = 8 + 9 = 17$ and only 17 is odd.) As a check we find that $2^{17} = 131,072 = 10$ (mod 19), so that $y = \alpha^x$ (mod p).

It is seen that the logarithmic convertor requires a mod p inverter for computing $\beta = \alpha^{-1}$ (mod p). As already noted, this can be obtained using the extended form of Euclid's algorithm, which requires the use of the divider of FIG. 8, the multiplier of FIG. 3, and the comparator of FIG. 5. The logarithmic convertor also requires the divider of FIG. 8 (for computing successive values of n), the adder of FIG. 4 (for incrementing j), the modulo p exponentiator of FIG. 10 (for computing W and $\beta^{b_j}$ and for precomputing the $g_i(W)$ table), the modulo p multiplier of FIG. 3 (for computing successive values of Z), and the comparator of FIG. 5 (for determining when $j = N_i$). The logarithmic convertor's use of the Chinese remainder theorem requires only devices which have already been described (the multiplier of FIG. 3 and a modulo m inverter).

In the first method of generating a trap door knapsack vector, a very difficult knapsack problem involving a vector a was transformed into a very simple and easily solved knapsack problem involving a', by means of the transformation:

$$a_i' = 1/w^* a_i \text{ mod } m$$  (36)

A knapsack involving a could be solved because it was transformable into another knapsack involving a' that was solvable. Notice, though, that is does not matter why knapsacks involving a' are solvable. Thus, rather than requiring that a' satisfy (1), it could be required that a' be transformable into another knapsack problem involving a'', by the transformation:

$$a_i'' = 1/w'^* a_i' \text{ mod } m'$$  (37)

where a'' satisfies (1), or is otherwise easy to solve. Having done the transformation twice, there is no problem in doing this a third time; in fact, it is clear that this process may be iterated as often as desired.

With each successive transformation, the structure in the publicly known vector, a, becomes more and more obscure. In essence, we are encrypting the simple knapsack problem by the repeated application of a transformation which preserves the basic structure of the problem. The final result a appears to be a collection of random numbers. The fact that the problem can be easily solved has been totally obscured.

The original, easy to solve knapsack vector can meet any condition, such as (1) which guarantees that it is easy to solve. For example it could be a multiplicative trap door knapsack. In this way it is possible to combine both of the trap door knapsack methods into a single method, which is presumably harder to break.

It is important to consider the rate of growth of a, because this rate determines the data expansion involved in transmitting the n dimensional vector x as the larger quantity S. The rate of growth depends on the method of selecting the numbers, but in a "reasonable" implementation, with $n = 100$, each $a_i$ will be at most 7 bits larger than the corresponding $a'_i$, each $a'_i$ will be at most 7 bits larger than $a''_i$, etc., etc. Each successive stage of the transformation will increase the size of the problem by only a small, fixed amount. If we repeat the transformation 20 times, this will add at most 140 bits to each $a_i$. If each $a_i$ is 200 bits long to begin with, then they need only be 340 bits long after 20 stages. The knapsack vector, for $n=100$, will then be at most $100*340=34$ kilobits in size.

Usual digital authenticators protect against third party forgeries, but cannot be used to settle disputes between the transmitter 11 and receiver 12 as to what message, if any, was sent. A true digital signature is also called a receipt because it allows the receiver 12 to prove that a particular message M was sent to it by the transmitter 11. Trap door knapsacks can be used to generate such receipts in the following manner.

If every message M in some large fixed range had an inverse image x, then it could be used to provide receipts. Transmitter 11 creates knapsack vectors b' and b such that b' is a secret key, such as an easily solved knapsack vector, and that b is a public key, such as is obtained via the relation $$b_i = w*b_i' \bmod m \tag{38}$$

Vector b is then either placed in a public file or transmitted to receiver 12. When transmitter 11 wants to provide a receipt for message M, transmitter 11 would compute and transmit x such that $b*x=M$. Transmitter 11 creates x for the desired message M by solving the easily solved knapsack problem.

$$\begin{aligned} M' &= 1/w * M \bmod m & (39) \\ &= 1/w * \Sigma\, x_i * b_i \bmod m & (40) \\ &= 1/w * \Sigma\, x_i * w * b_i' \bmod m & (41) \\ &= \Sigma\, x_i * b_i' \bmod m & (42) \end{aligned}$$

The receiver 12 could easily compute M from x and, by checking a date/time field (or some other redundancy in M), determine that the message M was authentic. Because the receiver 12 could not generate such an x, since it requires b' which only the transmitter 11 possesses, the receiver 12 saves x as proof that transmitter 11 sent message M.

This method of generating receipts can be modified to work when the density of solutions (the fraction of messages M between 0 and $\Sigma b_i$ which have solutions to $b*x=M$) is less than 1, provided it is not too small. The message M is sent in plaintext form, or encrypted as described above if eavesdropping is a concern, and a sequence of related oneway functions $y_1=F_1(M)$, $y_2=F_2(M)$, ... are computed. The transmitter 11 then seeks to obtain an inverse image, x, for $y_1, y_2, \ldots$ until one is found and appends the corresponding x to M as a receipt. The receiver 12 computes $M'=b*x$ and checks that $M'=y_i$ where i is within some acceptable range.

The sequence of one-way functions can be as simple as:

$$F_i(M) = F(M) + i \tag{43}$$

or $$F_i(M) = F(M+i) \tag{44}$$

where F(*) is a one-way function. It is necessary that the range of F(*) have at least $2^{100}$ values to foil trial and error attempts at forgery.

It is also possible to combine the message and receipt as a single message-receipt datum. If the acceptable range for i is between 0 and $2^I-1$ and the message is J bits long then a single number, $J+I$ bits long, can represent both the message and i. The transmitter 11 checks for a solution to $b*x=S$ for each of the $2^I$ values of S which result when, for example, the first J bits of S are set equal to the message and the last I bits of S are unconstrained. The first such solution x is conveyed to the receiver 12 as the message-receipt. Receiver 12 recovers S by computing the dot product of the public key b and the message-receipt combination x, and retaining the first J bits of S thus obtained. The authenticity of the message is validated by the presence of appropriate redundancy in the message, either natural redundancy if the message is expressed in a natural language such as English, or artificial redundancy such as the addition of a date-time field in the message.

Redundancy is used here in the sense of information theory [Claude E. Shannon, "The Mathematical Theory of Communication", *Bell System Technical Journal*, Vol. 27, p. 379 and p. 623, 1948] and complexity theory [Gregory J. Chaitin "On the Length of Programs for Computing Finite Binary Sequences", Journal of the Association for Computing Machinery, Vol. 13, p. 547, 1966] to measure the structure (deviation from complete randomness and unpredictability) in a message. A source of messages possesses no redundancy only if all characters occur with equal probability. If it is possible to guess the characters of the message with a better than random success rate, the source possesses redundancy and the rate at which a hypothetical gambler can make his fortune grow is the quantitative measure of redundancy. [Thomas M. Cover and Roger C. King, "A Convergent Gambling Estimate of the Entropy of English", Technical Report #22, Statistics Department, Stanford University, Nov. 1, 1976]. Humans can easily validate the message by performing a redundancy check (e.g., determine if the message is grammatically correct English). By simulating the gambling situation, it is possible for a machine to validate whether or not a message possesses the redundancy appropriate to its claimed source.

There are many methods for implementing this form of the invention. Part of the deciphering key D could be public knowledge rather than secret, provided the part of D which is withheld prevents the eavesdropper 13 from recovering the plaintext message X.

Variations on the above described embodiment are possible. For example, in some applications, it will prove valuable to have the $i^{th}$ receiver of the system generate a trap door knapsack vector $a^{(i)}$ as above, and place the vector or an abbreviated representation of the vector in a public file or directory. Then, a transmitter who wishes to establish a secure channel will use $a^{(i)}$ as the enciphering key for transmitting to the $i^{th}$ receiver. The advantage is that the $i^{th}$ receiver, once having proved his identity to the system through the use of his driver's license, fingerprint, etc., can prove his identity to the transmitter by his ability to decipher data encrypted with enciphering key $a^{(i)}$. Thus, although the best mode contemplated for carrying out the present invention has been herein shown and described, it will be apparent that modification and variation may be made without departing from what is regarded to be the subject matter of this invention.

What is claimed is:

1. In a method of communicating securely over an insecure communication channel of the type which communicates a message from a transmitter to a receiver, the improvement characterized by:

providing random numbers at the receiver;
generating from said random numbers a public enciphering key at the receiver;
generating from said random numbers a secret deciphering key at the receiver such that the secret deciphering key is directly related to and computationally infeasible to generate from the public enciphering key;
communicating the public enciphering key from the receiver to the transmitter;
processing the message and the public enciphering key at the transmitter and generating an enciphered message by an enciphering transformation, such that the enciphering transformation is easy to effect but computationally infeasible to invert without the secret deciphering key;
transmitting the enciphered message from the transmitter to the receiver; and
processing the enciphered message and the secret deciphering key at the receiver to transform the enciphered message with the secret deciphering key to generate the message.

2. In a method of communicating securely over an insecure communication channel as in claim 1, further comprising:
authenticating the receiver's identity to the transmitter by the receiver's ability to decipher the enciphered message.

3. In a method of communicating securely over an insecure communication channel as in claim 2 wherein the step of:
authenticating the receiver's identity includes the receiver transmitting a representation of the message to the transmitter.

4. In a method of providing a digital signature for a communicated message comprising the steps of
providing random numbers at the transmitter;
generating from said random numbers a public key at the transmitter;
generating from said random numbers a secret key at the transmitter such that the secret key is directly related to and computationally infeasible to generate from the public key;
processing the message to be transmitted and the secret key at the transmitter to generate a digital signature at said transmitter by transforming a representation of the message with the secret key, such that the digital signature is computationally infeasible to generate from the public key;
communicating the public key to the receiver;
transmitting the message and the digital signature from the transmitter to the receiver;
receiving the message and the digital signature at the receiver and transforming said digital signature with the public key to generate a representation of the message; and
validating the digital signature by comparing the similarity of the message to the representation of the message generated from the digital signature.

5. A method of providing a message digital signature receipt for a communicated message comprising the steps of:
providing random numbers at the transmitter;
generating from said random numbers a public key at the transmitter;
generating from said random numbers a secret key at the transmitter such that the secret key is directly related to and computationally infeasible to generate from the public key;
processing the message and the secret key at the transmitter and generating a message-digital signature at said transmitter by transforming a representation of the message with the secret key, such that the message-digital signature is computationally infeasible to generate from the public key;
communicating the public key to the receiver;
transmitting the message-digital signature from the transmitter to the receiver;
processing the message-digital signature and the public key at the receiver and transforming the message-digital signature with the public key; and
validating the transformed message-digital signature by checking for redundancy.

6. In an apparatus for communicating securely over an insecure communication channel of the type which communicates a message from a transmitter to a receiver, the improvement characterized by:
means for generating random information at the receiver;
means for generating from said random information a public enciphering key at the receiver, means for generating from said random information a secret deciphering key such that the secret deciphering key is directly related to and computationally infeasible to generate from the public enciphering key;
means for communicating the public enciphering key from the receiver to the transmitter;
means for enciphering a message at the transmitter having an input connected to receive said public enciphering key, having another input connected to receive said message, and serving to transform said message with said public enciphering key, such that the enciphering transformation is computationally infeasible to invert without the secret deciphering key;
means for transmitting the enciphered message from the transmitter to the receiver; and
means for deciphering said enciphered message at the receiver having an input connected to receive said enciphered message, having another input connected to receive said secret deciphering key and serving to generate said message by inverting said transformation with said secret deciphering key.

7. In a method of communicating securely over an insecure communication channel of the type which communicates a message from a transmitter to a receiver, the improvement characterized by:
generating a secret deciphering key at the receiver by generating an n dimensional vector a', the elements of vector a', being defined by $$a_i' > \sum_{j=1}^{i-1} a_j' \text{ for } i = 1, 2, \ldots n$$

where n is an integer;
generating a public enciphering key at the receiver by generating an n dimensional vector a, the elements of vector a being defined by $$a_i = (w^* a_i' \bmod m) + km \text{ for } i = 1, 2, \ldots n$$

where m and w are large integers, w is invertible modulo m, and k is an integer;

transmitting the public enciphering key from the receiver to the transmitter;

receiving the message and the public enciphering key at the transmitter and generating an enciphered message by computing the dot product of the message, represented as a vector x with each element being 0 or 1, and the public enciphering key, represented as the vector a, to represent the enciphered message S being defined by $$S = a*x$$

transmitting the enciphered message from the transmitter to the receiver; and receiving the enciphered message and the secret deciphering key at the receiver and transforming the enciphered message with the secret deciphering key to generate the message by computing $$S' = 1/w*S \bmod m$$

and letting $x_i = 1$ if and only if $$[S' - \sum_{j=i+1}^{n} x_j * a_j'] \geq a_i'$$

and letting $x_i = 0$ if $$[S' - \sum_{j=i+1}^{n} x_j * a_j'] < a_i'$$

for $i = n, n-1, \ldots 1$.

8. In a method of communicating securely over an insecure communication channel of the type which communicates a message from a transmitter to a receiver, the improvement characterized by:

generating a secret deciphering key at the receiver by generating an n dimensional vector a', the elements of vector a' being defined by $$a_i' > l \sum_{j=1}^{i-1} a_j$$

for $i = 1, 2, \ldots n$ where l and n are integers;

generating a public enciphering key at the receiver by generating an n dimensional vector a, the elements of vector a being defined by $$a_i = (W*a_i' \bmod m) + km \text{ for } i = 1, 2, \ldots n$$

where m and w are large integers, w is invertible modulo m and k is an integer;

transmitting the public enciphering key from the receiver to the transmitter;

receiving the message and the public enciphering key at the transmitter and generating an enciphered message by computing the dot product of the message, represented as a vector x with each element being an integer between 0 and l, and the public enciphering key, represented as the vector a, to represent the enciphered message S being defined by $$S = a*x;$$

transmitting the enciphered message from the transmitter to the receiver; and receiving the enciphered message and the secret deciphering key at the receiver and transforming the enciphered message with the secret deciphering key to generate the message by computing $$S' = 1/w*S \bmod m$$

and letting $x_i$ be the integer part of $$[S' - \sum_{j=i+1}^{n} x_j * a_j']/a_i'$$

for $i = n, n-1, \ldots 1$.

9. In a method of communicating securely over an insecure communication channel of the type which communicates a message from a transmitter to a receiver, the improvement characterized by:

generating a secret deciphering key at the receiver by generating an n dimensional vector a', the elements of vector a' being relatively prime and n being an integer;

generating a public enciphering key at the receiver by generating an n dimensional vector a, the elements of vector a being defined by $$a_i = \log_b a_i' \bmod m \text{ for } i = 1, 2 \ldots n$$

where b and m are large integers and m is a prime number such that $$m > \prod_{i=1}^{n} a_i';$$

transmitting the public enciphering key from the receiver to the transmitter;

receiving the message and the public enciphering key at the transmitter and generating an enciphered message by computing the dot product of the message, represented as a vector x, and the public enciphering key, represented as the vector a, to represent the enciphered message S being defined by $$S = a*x;$$

transmitting the enciphered message from the transmitter to the receiver; and receiving the enciphered message and the secret deciphering key at the receiver and transforming the enciphered message with the secret deciphering key to generate the message by computing $$S' = b^S \bmod m$$

and letting $x_i = 1$ if and only if the quotient of $S'/a_i$ is an integer and letting $x_i = 0$ if the quotient of $S'/a_i$ is not an integer.

10. In an apparatus for communicating securely over an insecure communication channel of the type which communicates a message from a transmitter to a receiver, the improvement characterized by:

means for generating a secret deciphering key at the receiver by generating an n dimension vector a', the elements of vector a' being defined by $$a_i' > \sum_{j=1}^{i-1} a_j \text{ for } i = 1, 2, \ldots n$$

where n is an integer;
means for generating a public enciphering key at the receiver by generating an n dimensional vector a, the elements of vector a being defined by $$a_i = (w^*a_i' \bmod m) + km \text{ for } i = 1, 2, \ldots n$$

where m and w are large integers, w is invertible modulo m, and k is an integer;
means for transmitting the public enciphering key from the receiver to the transmitter;
means, for enciphering a message at the transmitter, having an input connected to receive the public enciphering key, having another input connected to receive the message, and having an output that generates an enciphered message that is a transformation of the message with the public enciphering key by computing the dot product of the message, represented as a vector x with each element being 0 or 1, and the public enciphering key, represented as the vector a, to represent the enciphered message S being defined by $$S = a^*x$$

means for transmitting the enciphered message from the transmitter to the receiver; and
means for deciphering the enciphered message at the receiver, having an input connected to receive the enciphered message, having aother input connected to receive the secret deciphering key, and having an output for generating the message by inverting the transformation with the secret deciphering key by computing $$S' = 1/w^*S \bmod m$$

and letting $x_i = 1$ if and only if $$[S' - \sum_{j=i+1}^{n} x_j * a_j] \geq a_i'$$

and letting $x_i = 0$ if $$[S' - \sum_{j=i+1}^{n} x_j * a_j] < a_i'$$

for $i = n, n-1, \ldots 1$.

11. In an apparatus for communicating securely over an insecure communication channel of the type which communicates a message from a transmitter to a receiver, the improvement characterized by:
means for generating a secret deciphering key at the receiver by generating an n dimensional vector a', the elements of vector a' being defined by $$a_i' > l \sum_{j=1}^{i-1} a_j \text{ for } i = 1, 2, \ldots n$$

where l and n are integers;
means for generating a public enciphering key at the receiver by generating an n dimensional vector a, the elements of vector a being defined by $$a_i = (w^*a_i' \bmod m) + km \text{ for } i = 1, 2, \ldots n$$

where m and w are large integers, w is invertible modulo m, and k is an integer;
means for transmitting the public enciphering key from the receiver to the transmitter;
means, for enciphering a message at the transmitter, having an input connected to receive the public enciphering key, having another input connected to receive the message, and having an output that generates an enciphered message that is a transformation of the message with the public enciphering key by computing the dot product of the message, represented as a vector x with each element being an integer between 0 and l, and the public enciphering key, represented as the vector a, to represent the enciphered message S being defined by $$S = a^*x;$$

means for transmitting the enciphered message from the transmitter to the receiver; and
means for deciphering the enciphered message at the receiver, having an input connected to receive the enciphered message, having another input connected to receive the secret deciphering key, and having an output for generating the message by inverting the transformation with the secret deciphering key by computing $$S' = 1/w^*S \bmod m$$

and letting $x_i$ be the integer part of $$[S' - \sum_{j=i+1}^{n} x_j * a_j]/a_i'$$

for $i = n, n-1, \ldots 1$.

12. In an apparatus for communicating securely over an insecure communication channel of the type which communicates a message from a transmitter to a receiver, the improvement characterized by:
means for generating a secret deciphering key at the receiver by generating an n dimensional vector a', the elements of vector a' being relatively prime and n being an integer;
means for generating a public enciphering key at the receiver by generating an n dimensional vector a, the elements of vector a being defined by $$a_i = \log_b a_i' \bmod m \text{ for } i = 1, 2, \ldots n$$

where b and m are large integers and m is a prime number such that $$m > \prod_{i=1}^{n} a_i';$$

means for transmitting the public enciphering key from the receiver to the transmitter;
means, for enciphering a message at the transmitter, having an input connected to receive the public enciphering key, having another input connected to receive the message, and having an output that generates an enciphered message that is a transformation of the message with the public enciphering key by computing the dot product of the message, represented as a vector x with each element being 0 or 1, and the public enciphering key, represented as the vector a, to represent the enciphered message S being defined by $$S = a \cdot x;$$

means for transmitting the enciphered message from the transmitter to the receiver; and means for deciphering the enciphered message at the receiver, having an input connected to receive the enciphered message, having another input connected to receive the secret deciphering key, and having an output for generating the message by inverting the transformation with the secret deciphering key by computing $$S' = b^S \bmod m$$

and letting $x_i = 1$ if and only if the quotient of $S'/a_i$ is an integer and letting $x_i = 0$ of the quotient of $S'/a_i$ is not an integer.

13. In an apparatus for enciphering a message that is to be transmitted over an insecure communication channel having an input connected to receive a message to be maintained secret, having another input connected to receive a public enciphering key, and having an output for generating the enciphered message, characterized by:

means for receiving the message and converting the message to a vector representation of the message;

means for receiving the public enciphering key and converting the public enciphering key to a vector representation of the public enciphering key; and means for generating the enciphered message by computing the dot product of the vector representation of the message and the vector representation of the public enciphering key, having an input connected to receive the vector representation of the message, having another input connected to receive the vector representation of the public enciphering key, and having an output for generating the enciphered message.

14. In a method of communicating securely over an insecure communication channel of the type which communicates a message from a transmitter to a receiver the improvement characterized by:

generating a secret deciphering key at the receiver;

generating a public enciphering key at the receiver, such that the secret deciphering key is computationally infeasible to generate from the public enciphering key;

transmitting the public enciphering key from the receiver to the transmitter;

processing the message and the public enciphering key at the transmitter by computing the dot product of the message, represented as a vector, and the public enciphering key, represented as a vector, to represent the enciphered message, such that the enciphering transformation is easy to effect but computationally infeasible to invert without the secret deciphering key;

transmitting the enciphered message from the transmitter to the receiver;

and processing the enciphered message and the secret deciphering key at the receiver and inverting said transformation by transforming the enciphered message with the secret deciphering key to generate the message.

15. In an apparatus for communicating securely over an insecure communication channel of the type which communicates a message from a transmitter to a receiver, the improvement characterized by:

means for generating a secret deciphering key at the receiver;

means for generating a public enciphering key at the receiver, such that the secret deciphering key is computationally infeasible to generate from the public enciphering key;

means for transmitting the public enciphering key from the receiver to the transmitter;

means for enciphering a message at the transmitter having an input connected to receive said public enciphering key and having another input connected to receive said message and serving to transform said message by computing the dot product of said message, represented as a vector, and said public enciphering key, represented as a vector, to represent said enciphered message, such that the enciphering transformation is computationally infeasible to invert without the secret deciphering key;

means for transmitting the enciphered message from the transmitter to the receiver;

and means for deciphering said enciphered message at the receiver, said means having an input connected to receive said enciphered message and having another input connected to receive said secret deciphering key and serving to generate said message by inverting the transformation with said secret deciphering key.

16. An apparatus for deciphering an enciphered message that is received over an insecure communication channel including means for receiving the enciphered message that is enciphered by an enciphering transformation in which a message to be maintained secret is transformed with a public enciphering key, and means for receiving a secret deciphering key to generate the message by inverting the enciphering transformation;

means for generating the message having an input connected to receive the inverse of the enciphered message and an output for generating the message;

said secret deciphering key being computationally infeasible to generate from the public enciphering key, and said enciphering transformation being computationally infeasible to invert without the secret deciphering key in which said means for inverting the enciphering transformation includes means for computing $$S' = 1/w \cdot S \bmod m; \text{ and}$$

said means for generating the message includes means for setting $x_i$ equal to the integer part of $$\left[ S' - \sum_{j=i+1}^{n} x_j \cdot a_j' \right] / a_i' \text{ for } i = n, n-1, \ldots 1$$

where m and w are large integers and w is invertible modulo m, where S' is the inverse of the enciphered message S being defined by the enciphering transformation $$S = a * x$$

where the message is represented as an n dimensional vector x with each element $x_i$ being an integer between 0 and 1, where 1 is an integer, and where the public enciphering key is represented as an n dimensional vector a, the elements of a being defined by $$a_i = (w * a_i') \mod m) + km \text{ for } i = 1, 2, \ldots n$$

where k and n are integers and the secret deciphering key is m, w and a', where a' is an n dimensional vector, the elements of a' being defined by $$a_i' > l \sum_{j=1}^{i-1} a_j \text{ for } i = 1, 2, \ldots n$$

17. An apparatus for deciphering an enciphered message that is received over an insecure communication channel including
means for receiving the enciphered message that is enciphered by an enciphering transformation in which a message to be maintained secret is transformed with a public enciphering key, and means for receiving a secret deciphering key to generate the messge by inverting the enciphering transformation;
means for generating the message having an input connected to receive the inverse of the enciphered message and an output for generating the message;
said secret deciphering key being computationally infeasible to generate from the public enciphering key, and said enciphering transformation being computationally infeasible to invert without the secret deciphering key in which
said means for inverting the enciphering transformation includes means for computing $$S' = b^S \mod m; \text{ and}$$

said means for generating the message includes means for setting $x_i = 1$ if and only if the quotient of $S'/a_i$ is an integer and setting $x_i = 0$ of the quotient of $S'/a_i$ is not an integer, where b and m are large integers and m is a prime number such that $$m > \prod_{i=1}^{n} a_i'$$

where n is an integer and the secret deciphering key is b,m, and a', where a' is an n dimensional vector with each element $a_i'$ being relatively prime, and where S' is the inverse of the enciphered message S being defined by the enciphering transformation $$S = a * x$$

where the message is represented as an n dimensional vector x with each element $x_i$ being 0 or 1, and the public enciphering key is represented as the n dimensional vector a, the elements of a being defined by $$a_i = \log_b a_i' \mod m \text{ for } i = 1, 2, \ldots n$$

* * * * *